3,113,489
SERVO MOTOR
Oliver B. Cruse, Florissant, and Cyril B. Fites, St. John, Mo., assignors to Wagner Electric Corporation, St. Louis, Mo., a corporation of Delaware
Filed Apr. 9, 1962, Ser. No. 186,048
10 Claims. (Cl. 91—372)

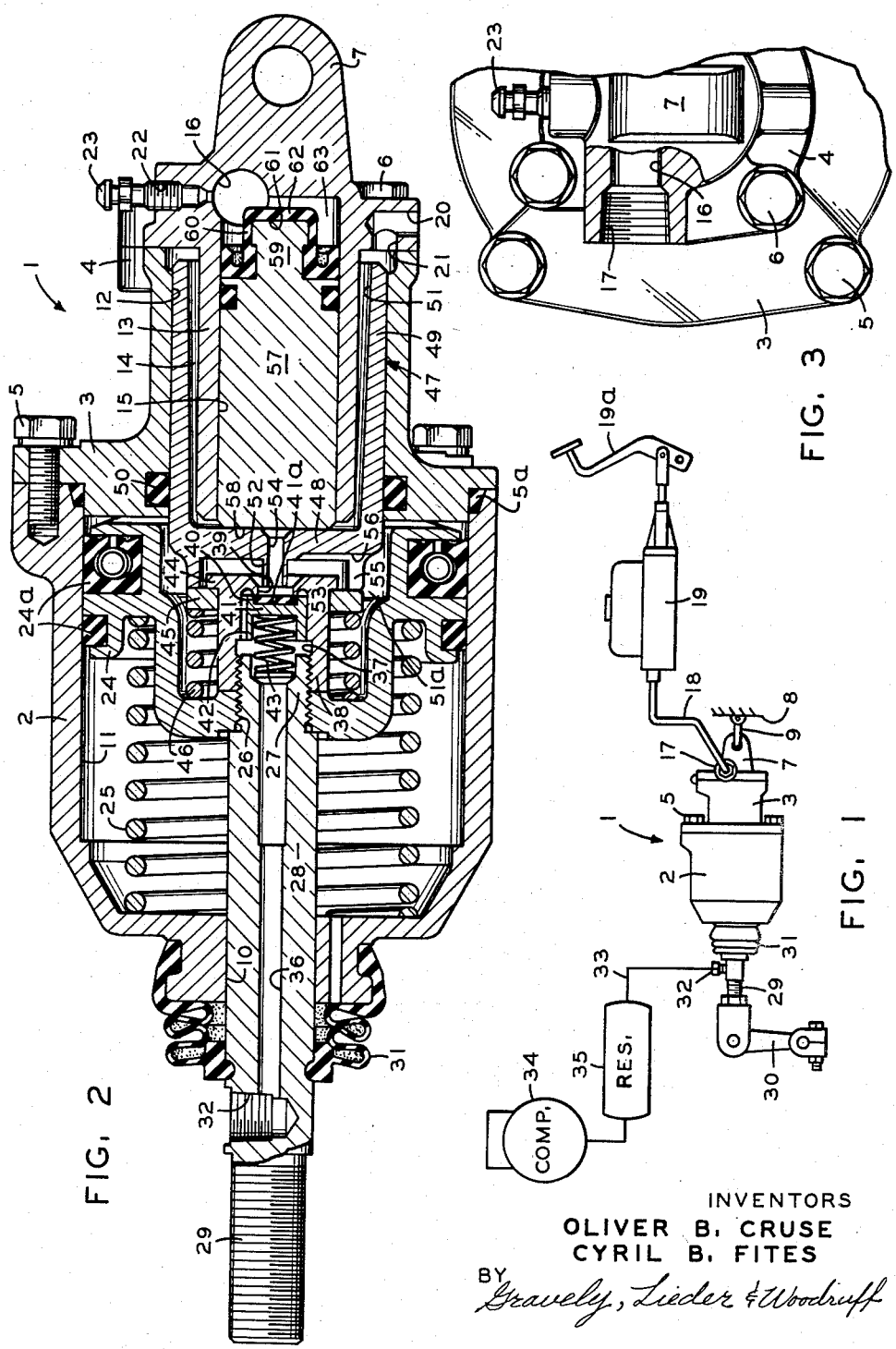
Dec. 10, 1963  O. B. CRUSE ETAL  3,113,489
SERVO MOTOR
Filed April 9, 1962
INVENTORS
OLIVER B. CRUSE
CYRIL B. FITES
BY Gravely, Lieder & Woodruff
ATTORNEYS United States Patent Office 3,113,489
Patented Dec. 10, 1963

This invention relates to servo motors, and more particularly to a follow-up type servo motor for controlling a friction device.

The principal object of the present invention is to provide a servo motor for providing rapid and positive response in the operation of a friction device, such as a brake or clutch mechanism, said servo motor having an hydraulically responsive control portion arranged in follow-up relation with a booster portion to regulate pressure fluid flow to said booster portion and having mechanical operation in the event of power failure.

Another object is to provide a simple, positive acting and economically manufactured servo motor.

These and other objects and advantages will become more apparent hereinafter.

Briefly, the invention is embodied in a servo motor for a friction device including a valve coring having control and working chambers, a slave piston in each of said chambers movable in follow-up relation, a pressure source connected to each of said chambers, valve means normally closing the working chamber, other valve means normally venting said working chamber to atmosphere, said slave piston in said control chamber being responsive to pressure therein to close said other valve means to seal said working chamber from atmosphere and open said first named valve means to establish communication between said pressure source and working chamber.

The invention also consists in the parts and in the combination and arrangement of parts hereinafter described and claimed. In the accompanying drawings which form a part of this specification and in which like numerals refer to like parts wherever they occur:

FIG. 1 is a diagrammatic view of an actuating system for a friction device with the servo motor emboding the invention shown therein, FIG. 2 is a greatly enlarged cross-sectional view of the servo motor shown in FIG. 1, and FIG. 3 is a right end view, partially in section, of the servo motor shown in FIG. 2.

Referring now to the drawings, the servo motor 1 is provided with a booster housing or portion 2, a control housing or portion 3, and a closure member 4, said booster and control housings being secured together by suitable means, such as studs 5, with an O-ring 5a sealably interposed therebetween and said closure member and control housing being secured together by suitable means, such as studs 6. An integral mounting flange 7 is provided on the closure member 4 and is connected to a fixed mounting member 8 by suitable means, such as pivotal linkage 9.

The booster housing 2 is provided with a bore 10 and an axially aligned counterbore 11, and the control housing 3 is provided with a bore 12 in axial alignment with said counterbore 11. The closure member 4 is provided with an integral cylindrical extension 13 which protrudes coaxially into the control housing bore 12 forming an annular chamber or passage 14 therebetween, and a bore 15 provided in said extension is coaxial with said control housing bore. A passage 16 has one end intersecting the extension bore 15 adjacent the rightward end thereof while the other end of said passage connects with a control port 17 provided in the closure member 4. The control port 17 receives one end of a conduit 18 while the other end thereof is connected with a hydraulic pressure generating means, such as a conventional master cylinder 19 and operating linkage 19a. The closure member 4 is also provided with an exhaust port 20, and a passage 21 is interposed between said exhaust port and the annular chamber 14 to communicate said annular chamber with the atmosphere. A bleeder port 22 is also provided in the closure member 4 connecting with the passage 16, and a conventional bleeder screw 23 is threadedly and sealably received in said bleeder port, said bleeder screw being utilized for the well known purpose of bleeding entrapped air from the extension bore 15.

A cup-shaped slave or booster piston 24 is slidably received in the booster housing counterbore 11 with seal means 24a therebetween, and the piston 24 is normally biased against the radial shoulder of the control housing 3 formed between said counterbore and the control housing bore 12 by the compressive force of a return spring 25 interposed between said booster piston and the endwall of said counterbore. A threaded bore 26 is provided in the booster piston 24 and a threaded interior end 27 of an actuating rod 28 is secured therein, said actuating rod being slidably received in the booster housing bore 10 and having an exterior end 29 operatively connected with actuating lever or linkage means 30 of a friction device (not shown). A resilient boot 31 is interposed between the booster housing 2 and the actuating rod 27 adjacent the exterior end 29 thereof to prevent the entry of foreign particles into the booster housing counterbore 11, and an inlet port 32 provided in said actuating rod exterior of the boot 31 is connected by a conduit 33 to a fluid pressure source, such as air compressor 34 and fluid pressure reservoir 35. An axially drilled passage 36 is provided in the actuating rod 27 having one end connecting with the inlet port 32 and the other end thereof extending through the interior actuating rod end 27 in communication with a bore 37 of a valve housing 38 threadedly positioned on the rod end 27 and projecting coaxially into the cup-shaped interior of the booster piston 24.

A passage or valve port 39 is provided through the endwall of the valve housing 38, and an annular valve seat 40 is provided on the radial shoulder formed at the juncture of said passage and valve housing bore. A valve member 41 having a hexagonally shaped body portion 42 is slidably received in the valve housing bore 37 and carries a disc-shaped valve element 41a. A valve spring 43 interposed between said valve member and the interior actuating rod end 27 normally biases said valve element 41a into sealable engagement with the valve seat 40. The free end of the valve housing 38 is provided with a radially extending flange 44, and an annular abutment member 45 slidably positioned on the peripheral surface of said valve housing 38 is normally biased into engagement with the flange 44 by the compressive force of a reaction spring 46 interposed between the abutment member 45 and the booster piston 24.

A reaction piston 47 is provided with a radially extending head portion 48 and an integrally formed sleeve portion 49, said sleeve portion being slidably received in the control housing bore 12 and sealably engaged with an O-ring 50 carried in said bore. A bore 51 is provided in the piston sleeve 49 in radially spaced relation with the peripheral surface of the closure member extension 13. The head portion 48 of the reaction piston 47 protrudes coaxially into the booster housing counterbore 11, and an expansible working chamber 51a is formed in said counterbore between the booster piston 24 and valve housing 38 and said reaction piston. The piston head 48 is provided with a centrally located, integrally formed valve stem 52 which protrudes freely into the valve housing passage 39, and a valve seat 53 is formed on the free end of said valve stem 52 and is normally juxtaposed with the valve element 41a. An axial passage 54 is formed in the valve stem 52 and piston head 48 extending through the valve seat 53 and connecting with the sleeve bore 51. The piston head 48 is also provided with an integrally formed annular abutment flange 55 which extends axially into abutment with the spring loaded abutment member 45 on the valve housing 38, and a radially extending groove 56 is provided through said annular flange to provide an unrestricted path for pressure fluid therepast.

A slave piston 57 is slidably received in the extension bore 15 and is provided with an abutment surface 58 on the leftward end thereof for driving engagement with the reaction piston head 48. The rightward end of the slave piston 57 is provided with an integral extension 59 having an enlarged collar 60 formed thereon. The piston extension 59 and collar 60 are received in a mating recess 61 of a sealing cup 62 to prevent displacement of said sealing cup therefrom, said sealing cup being sealably engaged between the slave piston 57 and the extension bore 15, and an expansible control chamber 63 is formed in the closure member bore 15 between the endwall thereof and said sealing cup.

In the operation of the servo motor 1 with the component parts thereof in the positions above described and assuming that fluid pressure has been established in the storage reservoir 35 by the compressor 34, an operator applied force in the linkage or pedal 19a displaces pressure fluid from the hydraulic master cylinder 19 through the conduit 18, the control port 17, and the passage 16 into the control chamber 63 to establish a fluid pressure which acts on the effective area of the sealing cup 62 creating a control force to move the slave piston 57 leftwardly in the extension bore 15. Since the slave piston 57 is abuttingly engaged with the reaction piston 47, said reaction piston is moved leftwardly against the compressive force of the reaction spring 46 to sealably engage the valve seat 53 on the valve stem 52 with the valve member 41 thereby interrupting communication between the working chamber 51a and the atmosphere through the valve stem passage 54, the reaction piston bore 51, the chamber 14, and the passage 21 and exhaust port 20. Further leftward movement of the slave piston 57 and reaction piston 47 disengages the valve member 41 from the cooperating valve seat 40 to permit the flow of pressure fluid from the fluid pressure storage reservoir 35 via the conduit 33, the inlet port 32 in the actuating rod 28, the actuating rod passage 36 into the valve housing bore 37 and therefrom past the hexagonally shaped valve body 42 through the passage 39 between the side wall thereof and the periphery of the valve stem 52 and into the working chamber 51a. The pressure fluid so transmitted to the working chamber 51a creates a fluid pressure therein which acts on the respective effective areas of the booster piston 24 and the reaction piston 47 to create a booster force to move said booster piston leftwardly in the booster housing counterbore 11 against the compressive force of the return spring 25 and in follow-up relation with said reaction piston; and this fluid pressure in the working chamber 51a also serves to create a reaction force to oppose leftward movement of said reaction piston and control piston 57 in response to the abovementioned control force. The leftward movement of the booster piston 24 moves the actuating rod 28 leftwardly to effect operating movement of the linkage 30 to energize the friction device (not shown).

When the opposing reaction and control forces become equal, further leftward movement of the reaction piston 47 and slave piston 57 is obviated; however, the booster force continues to move the booster piston 24 leftwardly until the valve seat 40 in the valve housing 38 is moved into lapped engagement with the valve member 41. During this lapped engagement the valve member 41 is engaged with the valve seat 40 interrupting pressure fluid communication between the working chamber 51a and the fluid pressure storage reservoir 35, and the valve seat 53 on the stem 52 is similarly lapped with said valve member interrupting pressure fluid communication between said working chamber and the atmosphere. If the operator desires to further energize the friction device, the manually applied force is increased by the operator resulting in the above described follow-up action of the booster and reaction pistons 24 and 47 to again move the valve seat 40 in the valve housing 38 and the valve seat 53 on the stem 52 into lapped engagement with the valve member 41.

Upon attainment of the desired energization of the friction device, the manually applied force is removed from the pedal 19a which permits the previously displaced pressure fluid to return from the control chamber 63 to the master cylinder 19 and relieves the fluid pressure in said control chamber. When the fluid pressure in the control chamber 63 is relieved, the control force is eliminated, and the reaction force plus the compressive force of the reaction spring serve to move the reaction piston 47 and slave piston 57 rightwardly. Initial rightward movement of the piston 47 permits the valve spring 43 to sealably re-engage the valve member 41 with the valve seat 40 in the valve housing 38 thereby interrupting pressure fluid communication between the working chamber 51a and the reservoir 35, and further rightward movement disengages the valve seat 53 on the stem 52 from said valve member to vent said working chamber to atmosphere via the stem passage 54, the reaction piston bore 51, the annular chamber 14, the passage 21 and the exhaust port 20. When the working chamber 51a is so vented to atmosphere, the booster and reaction forces are also eliminated, and the return spring 25 moves the booster piston 24, the reaction piston 47, the slave piston 57, and their component parts to their original positions thus serving to de-energize the friction device (not shown).

The present control mechanism or servo motor 1 is provided to energize a friction device, such as a brake or clutch mechanism, and utilizes a power piston or booster 24 to carry the principal work load. A slave piston or motor 37 is responsive to a relatively small input pressure from a master cylinder to operate valving 53, 41, 40 through a lost motion connection to apply fluid pressure from a source to the booster or working chamber 51a whereby direct power actuation of the lever 30 is effected. In the event of power failure, such as a non-producing compressor or a leak in the reservoir 35 or conduit 33, a manually applied force on the pedal 19a establishes pressure in the control chamber to create a control force, as previously described. The control force concertly moves the reaction piston 47 and slave piston 57 leftwardly against the compressive force of the reaction spring 46 to effect engagement between said reaction piston and the valve housing 38 and subsequently move the booster piston 24 and actuating rod 28 leftwardly to move the lever 30 and energize the friction device. Accordingly, the control force established by the hydraulic input pressure is transmitted through the slave piston 57, the reaction piston 47, the valve housing 38 and booster piston 24, and the rod 28 to actuate the lever 30 and energize the friction device without the assist of the abovementioned booster force.

It is now apparent that a novel control mechanism or servo motor meeting the objects set out hereinbefore is provided, and that changes and modifications in the disclosure may be made by those skilled in the art without departing from the spirit of the invention as defined by the claims which follow.

What we claim is:

1. A fluid pressure operated servo motor comprising a housing having aligned bores therein, a power piston slidable in one of said bores and having a work producing end extending exteriorly of said one bore, a pressure fluid inlet in said power piston adjacent the work producing end thereof, a reaction piston slidable in the other of said bores, a working chamber between said power and reaction pistons, passage means in said power piston between said inlet and working chamber, valve means in said passage means controlling pressure fluid communication between said inlet and working chamber, a valve stem on said reaction piston having an exhaust passage therein between said working chamber and other bore, an exhaust port in said other bore, a cylinder extending coaxially into said other bore, a slave piston slidable in said cylinder and engaged with said reaction piston, and a control port in said cylinder, said slave piston being movable in response to fluid pressure in said control port to move said reaction piston and engage said valve stem with said valve means closing said exhaust passage and to move said valve means to a position establishing pressure fluid communication between said inlet and working chamber, and said power piston being movable in follow-up relation with said reaction piston in response to fluid pressure in said working chamber to move the work producing end thereof in a work producing direction.

2. A fluid pressure operated servo motor comprising a housing having aligned bores therein, a power piston slidable in one of said bores and having an extension with a work producing end extending exteriorly of said one bore, a pressure fluid inlet in said extension adjacent the work producing end thereof, a reaction piston slidable in the other of said bores, a working chamber between said power and reaction pistons, passage means in said power piston and extension between said inlet and working chamber, valve means in said passage means normally interrupting pressure fluid communication between said inlet and working chamber, a valve stem on said reaction piston, an exhaust passage in said valve stem normally establishing pressure fluid communication between working chamber and other bore, an exhaust port in said other bore, a cylinder extending coaxially into said other bore, a slave piston slidable in said cylinder and engaged with said reaction piston, and a control port in said cylinder, said slave piston being movable in response to fluid pressure in said control port to move said reaction piston and engage said valve stem with said valve means to close said exhaust passage interrupting pressure fluid communication between said working chamber and other bore and to move said valve means to a position establishing pressure fluid communication between said inlet and working chamber, said power piston being movable in follow-up relation with said reaction and slave pistons in response to fluid pressure in said working chamber to move said power piston extension in a work producing direction.

3. A fluid pressure operated servo motor comprising a housing having aligned bores therein, a power piston slidable in one of said bores and having a work producing end extending exteriorly of said one bore, a valve chamber in said power piston, an inlet in said power piston adjacent the work producing end thereof exteriorly of said one bore, passage means in said power piston connecting said inlet and valve chamber, a reaction piston slidable in the other of said bores and extending into said one bore, an exhaust port in said other bore, a working chamber in said one bore between said power piston and reaction piston, a valve port in said power piston connecting said valve and working chambers, valve means in said valve chamber normally closing said valve port and interrupting pressure fluid communication between said valve and working chambers, valve stem means on said reaction piston extending into said valve port, an exhaust passage in said valve stem means between said working chamber and said other bore and normally venting said working chamber to atmosphere, a cylinder extending coaxially into said other bore in radially spaced relation with said reaction piston, a slave piston slidable in said cylinder and engaged with said reaction piston, and a control port connecting with said cylinder, said slave and reaction pistons being concertly movable in response to fluid pressure in said control port to initially engage said valve stem means with said valve means to close said exhaust passage and interrupt pressure fluid communication between said working chamber and the atmosphere and to subsequently move said valve means to a position opening said valve port to establish pressure fluid communication between said valve and working chambers, said power piston being responsive to fluid pressure in said working chamber to move the work producing end thereof in a work producing direction.

4. A friction device operating mechanism including a friction device having actuating lever means, a servo motor having a housing with a bore and an aligned counterbore therein, a power piston slidable in said counterbore and having a bore therein, a piston rod having opposed ends, one of said piston rod ends extending through said power piston bore and having an abutment surface thereon adapted to engage said power piston, the other of said piston rod ends extending exteriorly of said housing and being operatively connected with said actuating lever means, a valve housing secured to said one piston rod end, said power piston being abuttingly engaged between said valve housing and the abutment surface on said one piston rod end, a valve chamber in said valve housing, an inlet in said piston rod adjacent to said other piston rod end exteriorly of said housing, a source of fluid pressure connected with said inlet, first passage means in said piston rod connecting said inlet in pressure fluid communication with said valve chamber, a reaction piston extending into said counter bore and having a sleeve portion slidable in said housing bore, a working chamber in said counterbore between said power piston and valve housing and said reaction piston, second passage means in said valve housing connecting said valve and working chambers, a first valve seat in said valve chamber about said second passage means, valve means positioned entirely within said valve chamber and normally biased into sealable engagement with said first valve seat to interrupt pressure fluid communication between said valve and working chambers, a valve stem integrally formed on said reaction piston for movement through said second passage means, an axial exhaust passage extending through said valve stem and reaction piston and normally connecting said working chamber in pressure fluid communication with said housing bore, a second valve seat on the free end portion of said valve stem about said exhaust passage for engagement with said valve means, a closure member connected to said housing to close said housing bore, an integrally formed cylinder on said closure member extending coaxially into said housing bore in radial spaced relation with said reaction piston sleeve, an exhaust port in said closure member and connecting with said housing bore to vent said housing bore to atmosphere, a slave piston slidable in said cylinder and having a portion extending into said housing bore for abutment with said reaction piston, a control port in said closure member connecting with said cylinder, and hydraulic pressure generating means connected with said control port, said slave piston being initially movable in response to hydraulic pressure in said cylinder upon actuation of said hydraulic pressure generating means into abutment with said reaction piston, said slave and reaction pistons being subsequently concertly movable to move said valve stem through said second passage and engage said second valve seat with said valve means interrupting pressure fluid communication between said working chamber and housing bore through said exhaust passage and to disengage said valve means from said first valve seat establishing pressure fluid communication between said valve and working chambers, said power piston being movable in follow-up relation with said reaction and slave pistons in response to fluid pressure in said working chamber to move said piston rod and actuate the actuating lever means of said friction device.

5. A fluid pressure operated servo motor comprising a housing, a pair of piston means slidable in said housing and defining therewith expansible working and control chambers, one of said piston means normally opposing expansion of said working chamber and the other of said piston means normally opposing expansion of said control chamber, an inlet chamber in said one piston means adapted for fluid pressure communication with said working chamber, valve means controlling fluid pressure communication between said inlet and working chambers, a valve seat on said other piston means for engagement with said valve means, exhaust passage means in said other piston means and extending through said valve seat normally communicating said working chamber with the atmosphere, said other piston means being movable in response to fluid pressure in said control chamber to engage said valve seat with said valve means to close said exhaust passage means and then move said valve means to a position establishing pressure fluid communication between said inlet and working chambers, and said one piston means being movable in follow-up relation with said other piston means in response to established fluid pressure in said working chamber.

6. The fluid pressure operated servo motor according to claim 5 including a working end on said one piston means extending exteriorly of said housing wherein the established fluid pressure acts on the effective areas of said one and other piston means in said working chamber to oppose movement of said other piston means and move said one piston means in follow-up relation with said other piston means to actuate said working end in a work producing direction.

7. A fluid pressure operated servo motor comprising a housing having a pair of piston means slidable therein, a working chamber in said housing between said piston means, one of said piston means having a working end extending exteriorly of said housing, an inlet chamber in said one piston means adapted for pressure fluid communication with said working chamber, valve means controlling pressure fluid communication between said inlet and working chambers, a valve seat on the other of said piston means for sealing engagement with said valve means, exhaust passage means in said other piston means and extending through said valve seat normally communicating said working chamber with the atmosphere, an expansible control chamber in said housing, control means slidable in said housing for engagement with said other piston means and normally opposing expansion of said control chamber, said control means being movable in response to fluid pressure in said control chamber to move said other piston means and engage said valve seat with said valve means closing said exhaust passage means and to move said valve means to a position establishing pressure fluid communication between said inlet and working chambers, and said one piston means being movable in follow-up relation with said other piston means in response to established fluid pressure in said working chamber to move the working end thereof in a work producing direction.

8. A fluid pressure operated servo motor comprising a housing, a pair of piston means slidable in said housing and defining therebetween an expansible working chamber, one of said piston means normally opposing expansion of said working chamber and having a working end thereon extending exteriorly of said housing, an expansible control chamber in said housing, the other of said piston means normally opposing expansion of said control chamber, an inlet chamber in said one piston means, an inlet valve seat in said inlet chamber, a connecting passage in said one piston means extending through said inlet valve seat and between said inlet and working chambers, valve means normally urged into engagement with said inlet valve seat, and exhaust valve seat on said other piston means for engagement with said valve means, exhaust passage means in said other piston means and extending through said exhaust valve seat normally communicating said working chamber with the atmosphere, said other piston means being initially movable in response to fluid pressure in said control chamber to engage said exhaust valve seat with said valve means to close said exhaust passage means and interrupt communication between said working chamber and the atmosphere and subsequently movable to disengage said valve means from said inlet valve seat and establish pressure fluid communication between said inlet and working chambers, and said one piston means being movable in follow-up relation with said other piston means in response to established fluid pressure in said working chamber to move the working end thereof in a work producing direction.

9. A fluid pressure operated servo motor comprising a housing having aligned bores therein, a pair of piston means slidable in said bore, respectively, and defining therebetween a working chamber, an inlet chamber in one of said piston means, a connecting passage in said one piston means between said inlet and working chambers, valve means normally urged to a position closing said connecting passage and interrupting pressure fluid communication between said inlet and working chambers, an exhaust port in one of said bores, a valve seat on the other of said piston means for engagement with said valve means, an exhaust opening in said other piston means extending through said valve seat between said working chamber and said one bore, a cylinder connected with said housing and having a control chamber therein, control piston means normally opposing expansion of said control chamber and engaged with said other piston means, said exhaust opening being closed by movement of said valve seat into sealing engagement with said valve means upon concert movement of said control and other piston means in response to fluid pressure in said control chamber and said control and other piston means being thereafter concertly movable in response to fluid pressure in said control chamber to move said valve means to an open position and establish pressure fluid communication between said inlet and working chambers through said connecting passage, and said one piston means being movable in follow-up relation with said control and other piston means in response to established fluid pressure in said working chamber.

10. A fluid pressure operated servo motor comprising a housing having separate expansible working, exhaust and control chambers therein, piston means slidable in said housing and normally opposing expansion of said working chamber, an inlet chamber in said piston means adapted for pressure fluid communication with said working chamber, valve means in said piston means normally interrupting pressure fluid communication between said inlet and working chambers, valve control means for operative engagement with said valve means slidable in said housing between said working chamber and said exhaust and control chambers, an exhaust opening in said valve control means normally connecting said working chamber in pressure fluid communication with said exhaust chamber, said exhaust opening being closed by movement of said valve control means into engagement with said valve means in response to fluid pressure in said control chamber and said valve control means being thereafter movable in response to the fluid pressure in said control chamber to move said valve means to a position establishing pressure fluid communication between said inlet and working chambers, and said piston means being movable in follow-up relation with said valve control means in response to established fluid pressure in said working chamber.

References Cited in the file of this patent
UNITED STATES PATENTS

| | | |
|---|---|---|
| 2,745,383 | Hupp | May 15, 1956 |
| 2,883,971 | Ayers | Apr. 28, 1959 |
| 2,908,137 | Spalding, et al. | Oct. 13, 1959 |
| 2,953,120 | Ayers | Sept. 20, 1960 |